US011142445B2

(12) United States Patent
Leone

(10) Patent No.: US 11,142,445 B2
(45) Date of Patent: Oct. 12, 2021

(54) LIQUID SOURCE SWITCH-OVER DEVICE

(71) Applicant: New Finance Services Inc., New Westminster (CA)

(72) Inventor: Domenic Leone, Abbotsford (CA)

(73) Assignee: New Finance Services Inc., New Westminster (CA)

( * ) Notice: Subject to any disclaimer, the term of this patent is extended or adjusted under 35 U.S.C. 154(b) by 85 days.

(21) Appl. No.: 16/631,639

(22) PCT Filed: Jul. 17, 2018

(86) PCT No.: PCT/CA2018/050867
§ 371 (c)(1),
(2) Date: Jan. 16, 2020

(87) PCT Pub. No.: WO2019/014762
PCT Pub. Date: Jan. 24, 2019

(65) Prior Publication Data
US 2020/0207604 A1 Jul. 2, 2020

Related U.S. Application Data

(60) Provisional application No. 62/533,342, filed on Jul. 17, 2017.

(51) Int. Cl.
*B67D 1/12* (2006.01)
*F16K 11/07* (2006.01)
(Continued)

(52) U.S. Cl.
CPC ........ *B67D 1/1245* (2013.01); *F16K 11/0704* (2013.01); *F16K 31/363* (2013.01); *B67D 2001/0093* (2013.01); *F16K 31/18* (2013.01)

(58) Field of Classification Search
CPC .............................. B67D 1/12; B67D 1/1245; B67D 2001/0093; F16K 11/0704; F16K 31/122;
(Continued)

(56) References Cited

U.S. PATENT DOCUMENTS 2,358,512 A 9/1944 Hutsell
2,820,593 A * 1/1958 Goodbar .............. G05D 23/134
236/12.14
(Continued)

FOREIGN PATENT DOCUMENTS

AU 543860 5/1985
EP 0235437 A1 9/1987
(Continued)

OTHER PUBLICATIONS

International Search Report and Written Opinion from corresponding PCT/CA2018/050867.
(Continued)

*Primary Examiner* — Vishal Pancholi
*Assistant Examiner* — Bob Zadeh
(74) *Attorney, Agent, or Firm* — Nicholas Garner; Oyen Wiggs Green & Mutala LLP

(57) ABSTRACT

There is provided a liquid source switch-over device that includes a valve chamber having first and second inlets in communication with first and second sources of liquid and an outlet. A valve member, disposed within the valve chamber, has a first position that enables communication between the first inlet and the outlet and inhibits communication between the second inlet and the outlet. A catch is biased to abut the valve member when the catch is in fluid communication with the first source of liquid and inhibits displacement of the valve member from the first position. When the first source of liquid is depleted, a float member lowers and inhibits communication between the first source of liquid and the valve chamber. The valve member moves to a second position thereby that enables communication between the second inlet and the outlet and inhibits communication between the first inlet and the outlet.

20 Claims, 12 Drawing Sheets

(51) Int. Cl.
*F16K 31/363* (2006.01)
*B67D 1/00* (2006.01)
*F16K 31/18* (2006.01)

(58) Field of Classification Search
CPC ........ F16K 31/363; F16K 11/07; F16K 31/18; F16K 31/56; B21B 15/0035; B21B 33/00
See application file for complete search history.

(56) References Cited

U.S. PATENT DOCUMENTS

| | | |
|---|---|---|
| 3,741,689 A | 6/1973 | Rupp |
| 4,247,018 A | 1/1981 | Credle |
| 4,467,941 A | 8/1984 | Du |
| 4,674,526 A | 6/1987 | Athanassiu |
| 6,062,427 A | 5/2000 | Du |
| 7,331,488 B2 * | 2/2008 | Naslund ............ F16K 31/52416 134/100.1 |
| 8,276,784 B2 | 10/2012 | Ciavarella et al. |
| 8,561,842 B2 * | 10/2013 | Pizzacalla ............... F16K 31/30 222/66 |
| 2005/0072800 A1 | 4/2005 | Smith |
| 2011/0032497 A1 * | 2/2011 | Van Den Heuvel ...... B01F 5/14 355/30 |
| 2017/0057805 A1 * | 3/2017 | Bischel ............... F16K 37/0033 |

FOREIGN PATENT DOCUMENTS

| | | |
|---|---|---|
| EP | 0 587 344 | 3/1994 |
| WO | 0012425 A1 | 3/2000 |

OTHER PUBLICATIONS

Supplementary European Search Report issued on European Patent Application No. EP 18 83 5038 completed Apr. 7, 2021.

* cited by examiner

LIQUID SOURCE SWITCH-OVER DEVICE

CROSS REFERENCE TO RELATED APPLICATION

This application claims the benefit of provisional application No. 62/533,342 filed in the United States Patent and Trademark Office on Jul. 17, 2017, the disclosure of which is incorporated herein by reference and priority to which is claimed.

BACKGROUND OF THE INVENTION

Field of the Invention

There is provided a switch-over device. In particular, there is provided a liquid source switch-over device.

Description of the Related Art

U.S. Pat. No. 6,062,427 to Du discloses a self-actuating fluid dispenser change-over device for selectively dispensing a fluid from multiple fluid sources. The change-over device is provided with a housing having first and second cylinders. The change-over device is further provided with first and second pistons which are interconnected and movable between open and closed positions within respective ones of the first and second cylinders. The change-over device is further provided with a slide valve which is movable between first and second positions for alternately dispensing fluid from a respective one of the first and second cylinders. The change over device is further provided with a linkage which connects the pistons to the slide valve for moving the slide valve in response to movement of the pistons. The linkage has a biasing spring for urging the slide valve between a respective one of the first and second positions. The change-over device configured such that when first piston is in the open position, the second piston is in the closed position and when the second piston is in the open, position the first piston is in the closed position. The pistons move in response to a fluidic pressure differential between the first and second cylinders which is sufficiently large so as to cause flexure of the biasing spring thereby facilitating movement of the slide valve between the first and second positions.

U.S. Pat. No. 4,467,941 to Du discloses an apparatus and method for dispensing beverage syrup characterized by use of a low flow rate, positive displacement pump adapted to accurately deliver syrup from a collapsible bag/box syrup container to a dispensing nozzle. Air ingestion into the dispensing system is eliminated by use of a novel air trap/filter adapted to generate a high vacuum signal at the intake port of the pump in response to detecting the presence of air or encountering a syrup depletion condition which signal automatically discontinues pump operation. A vacuum actuated diverter valve is additionally incorporated into the dispensing system to permit the intake port of the pump to be automatically placed in flow communication with differing syrup containers, thereby allowing continuous syrup dispensing operation even during replacement of spent syrup containers.

Australian Patent No. AU-B-68867/81 to Dale discloses a valve assembly for controlling the alternate discharge from a first or a second pressurized liquid supply. The assembly includes a housing having a chamber therein. The assembly includes a discharge port from the chamber. The assembly includes first and second delivery ports to the chamber. The assembly includes first and second valve elements each associated with a respective one of the first and second delivery ports. The assembly includes first and second control valve devices each associated with a respective one of the first and second delivery ports. Each said control device comprises a main body with a float-chamber and a float valve which, in use, is adapted to float in liquid passing through the float-chamber and which is movable in response to changes in the volume of liquid within the float-chamber so that in one position the float valve cause the outlet to be blocked. The arrange is such that, in use, the first valve element is positioned to close the first delivery port and the second valve element is positioned to open the second delivery port and pressurized fluid flows from the second pressurized liquid supply through the float-chamber to the outlet through the delivery port into the chamber and is discharged through the outlet port. When the second liquid supply becomes exhausted, the float valve therein causes the outlet to be closed which thereby causes a drop of pressure in the chamber which in turn causes the first valve element to open and permit flow of liquid from the first pressurized liquid supply.

BRIEF SUMMARY OF INVENTION

There is provided, and it is an object to provide, an improved liquid source switch-over device.

There is accordingly provided a liquid source switch-over device. The device includes a valve chamber having first and second inlets and an outlet. The first and second inlets are in communication with first and second sources of liquid. The device includes a valve member disposed within the valve chamber. The valve member has a first position that enables communication between the first inlet and the outlet, and that inhibits communication between the second inlet and the outlet. The device includes a catch disposed within the valve chamber and biased to abut the valve member when the catch is in fluid communication with the first source of liquid. The catch inhibits displacement of the valve member from the first position thereby. The device includes a float member, whereby when the first source of liquid is depleted, the float member lowers and inhibits communication between the first source of liquid and the valve chamber. The valve member moves to a second position thereby that enables communication between the second inlet and the outlet and inhibits communication between the first inlet and the outlet.

There is also provided a liquid source switch-over device. The device includes a valve chamber having first and second inlets and an outlet. The first and second inlets are in communication with first and second sources of liquid. The device includes a valve member disposed within the valve chamber. The valve member has a first position in which communication between the first inlet and the outlet is promoted and communication between the second inlet and the outlet is inhibited. The valve member is moveable from the first position to a second position in communication between the first second and the outlet is promoted and communication between the first inlet and the outlet is inhibited. The device includes a catch apparatus shaped inhibit displacement of the valve member when the catch apparatus is in fluid communication with one of the sources of liquid.

There is further provided a switch-over device for flowable material. The device includes a switching cylinder. The switching cylinder has first and second inlets in communication with first and second sources of flowable material.

The switching cylinder has an outlet. The device includes a spool disposed within the switching cylinder. The spool has a first position that enables communication between the first inlet and the outlet and that inhibits communication between the second inlet and the outlet. The spool has a second position that enables communication between the second inlet and the outlet and that inhibits communication between the first inlet and the outlet. The device includes a hold-down piston in communication with the switching cylinder. The hold-down piston inhibits movement of the spool when the hold-down piston is in communication with flowable material from one of the sources of flowable material.

There is also provided a valve assembly having a first inlet connectable to a first source of flowable material, a second inlet connectable to a second source of flowable material and an outlet. The device includes a switching cylinder in fluid communication the inlets. The device includes a spool moveable within the switching cylinder, whereby pressure differences between the sources of flowable material position the spool in a first position that promotes flow of flowable material from a first one of the sources through a first one of the inlets and to the outlet. The device includes a catch apparatus in fluid communication in part with the outlet and which, when in communication with the flowable material from said first one of the sources, inhibits movement of the spool. When the first one of the sources is depleted, the switching cylinder is depressurized at the first one of the inlets and said outlet, thereby releasing the catch apparatus. Pressure of flowable material from a second one of the sources at the second one of the inlets causes the spool to move thereafter to a second position that promotes flow of the flowable material from the second one of the sources through a second one of the inlets and to the outlet, with the catch apparatus now in communication with the flowable material from said second one of the sources inhibiting movement of the spool once more.

There is yet further provided a wall mount for a valve assembly. The assembly includes a pair of conduits each having a lower portion and an upper portion coupled thereto. The lower portions of the conduits have cross-sectional areas smaller than that those of the upper portions of the conduits. The wall mount comprises a base connectable to a wall. The base has a pair of spaced-apart recesses each shaped to receive a respective one of the lower portions of the conduits. The upper portions of the conduits abut the base thereafter. The wall mount includes a pair of resilient members coupled to and extending outwards from the base. Each of the resilient members is biased towards and abutable against a respective one of the lower portions of the conduits.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
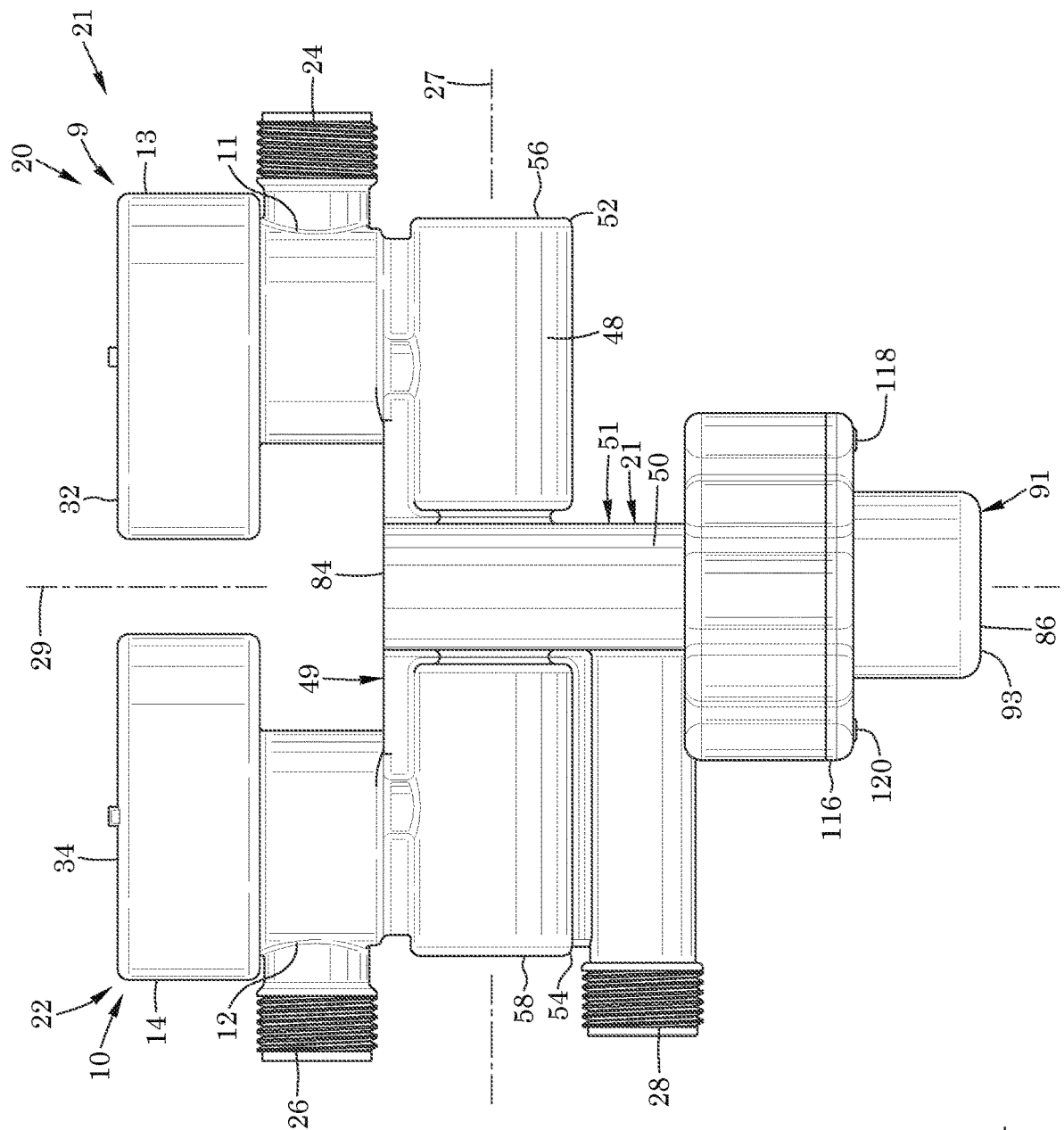
FIG. 1 is a front elevation view of a liquid source switch-over device according to a first aspect, the device including float chambers that are not shown.
Figure 4:
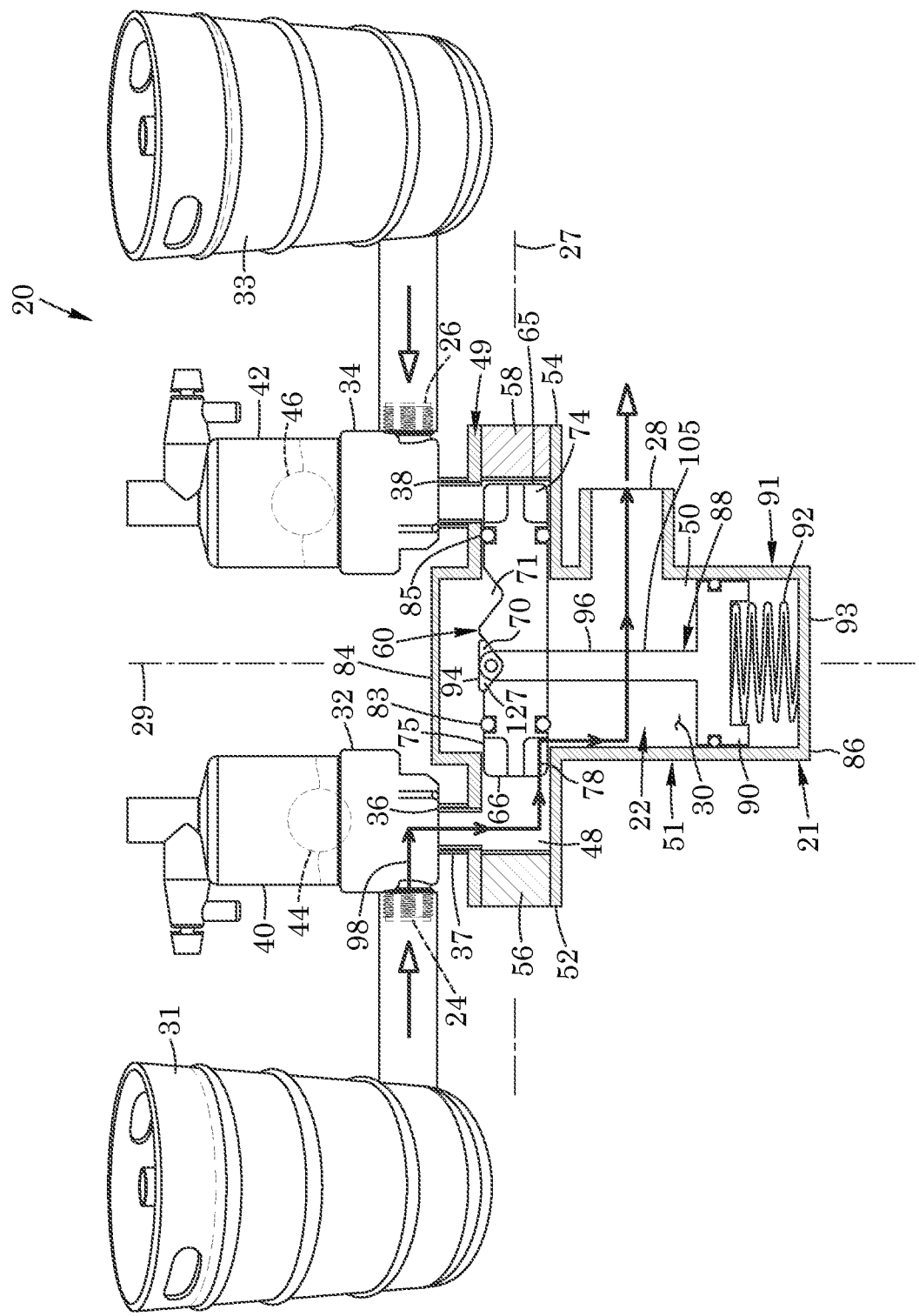
FIG. 4 is a schematic rear elevation view of the device of FIG. 1, with the float chambers being shown coupled to first and second sources of liquid and coupled to first and second inlets of the valve chamber, with the valve member being shown in a first position which promotes communication between the first inlet and the outlet of the valve chamber, and with the catch apparatus shown biased against a first recess of the valve member.

Referring to the drawings and first to FIG. 1, there is shown a valve assembly or switch-over device for flowable material, in this example a liquid source switch-over device 20. As seen in FIG. 4, the device includes a valve body 21 with a valve chamber 22 therewithin. The valve chamber has a first inlet 24, a second inlet 26, an outlet 28 and an interior 30. As seen in FIG. 1, in this example the inlets and outlet are male threaded connectors. Referring back to FIG. 4, the first inlet 24 is in communication with a first source of flowable material, in this example a first source 31 of liquid. The second inlet 26 is in communication with a second source of flowable material, in this example a second source 33 of liquid. The sources of liquid may be two beer kegs or two series-strings of beer kegs, or barrels, connected to the two inlets, for example. This is not strictly required and other flowable material, liquids or beverages may be used in other embodiments. This is may not be strictly limited to liquids, as flowable solids such as grain, coffee beans and the like may be used in some embodiments.

Before use, the sources 31 and 33 of liquid are pressurized, in this example with $CO_2$ gas. In some cases, the sources may be helped with beer pumps (not shown) for example. Generally, the pressures are equal for both sources 31 and 33 of liquid, but this is not a requirement, so long as there is some pressure in both sources. Alternatively, instead of the pressure arising from pumping a liquid (hydraulic) or compressing a gas (pneumatic), the pressure may be due to the sources of liquid being elevated tanks or kegs, for example, and with one of the sources being fuller than the other of the sources of liquid.

Figure 2:
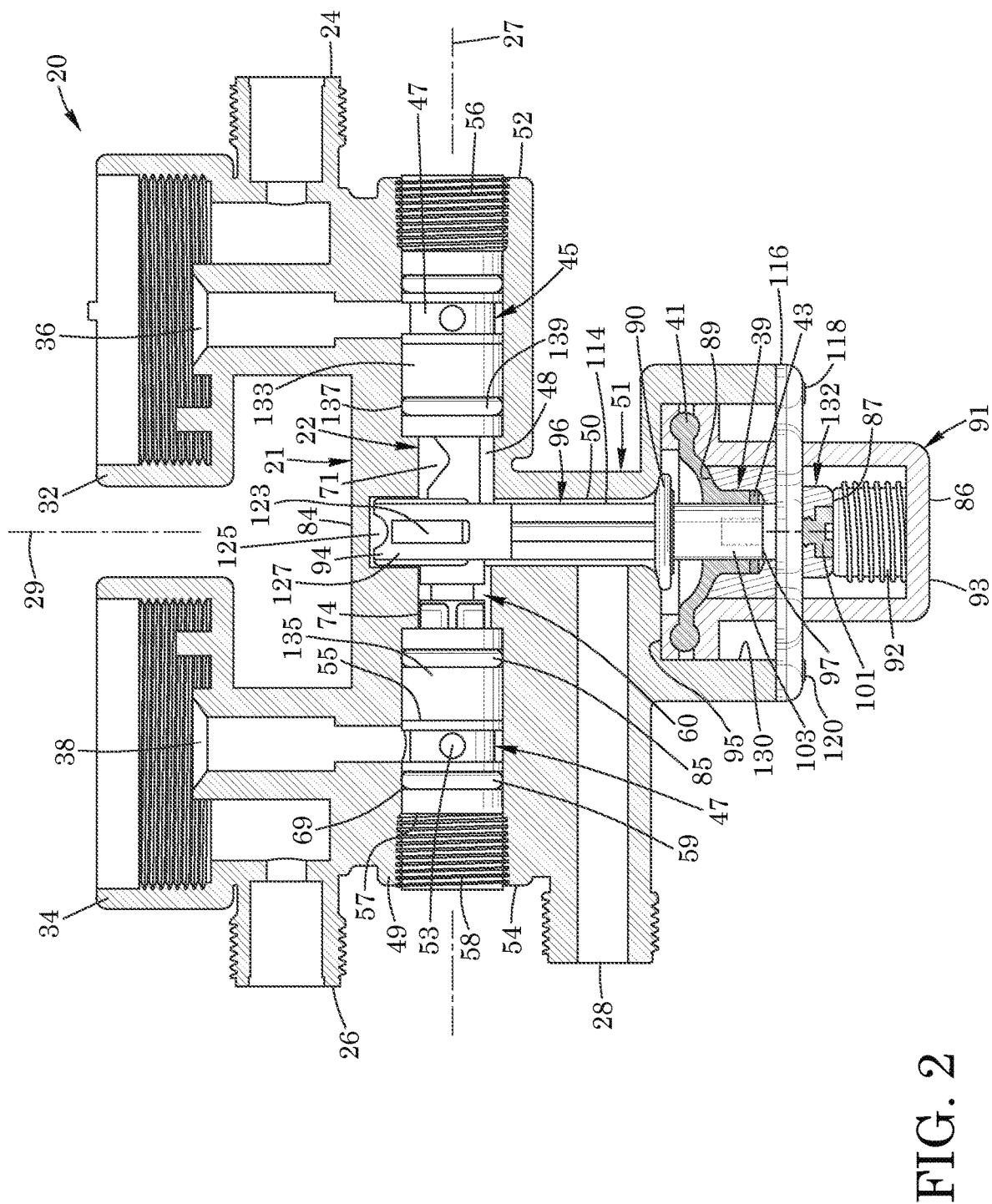
FIG. 2 is a cross-section elevation view of the device of FIG. 1.

As seen in FIG. 2, the valve body 21 includes a pair of female threaded sockets 32 and 34 adjacent to and in communication with inlets 24 and 26, respectively. As seen in FIG. 1, the sockets comprise conduits 9 and 10 with first or lower portions 11 and 12 and a second or upper portions 13 and 14 that couple to the lower portions. The upper portions of the conduit have a larger diameter relative to the lower portions of the conduits in this example.

The sockets 32 and 34 have float seats 36 and 38. As seen in FIG. 4, the device 20 includes a pair of outer chambers, in this example float chambers 40 and 42. The float chambers threadably couple to sockets 32 and 34 via male threading 37 in this example. The float chambers 40 and 42 are in communication with first source 31 of liquid and second source 33 of liquid, respectively. Inlets 24 and 26 of the valve chamber 22 are thus in communication with chambers 40 and 42, respectively. The device 20 includes float members 44 and 46, shown in ghost lines, which are housed within the float chambers and which are buoyant.

Still referring to FIG. 4, the valve chamber 22 includes a first passageway, in this example an inlet passageway 48 extending within a spool or switching cylinder 49. The inlet passageway and switching cylinder extend along a first longitudinal axis, in this example a horizontal axis 27. The valve chamber includes a second passageway, in this example an outlet passageway 50 extending within an outlet or catch cylinder 51. The outlet passageway and catch cylinder extend along a second longitudinal axis, in this example a vertical axis 29. The outlet passageway is larger in volume and diameter compared to the inlet passageway 48 in this case. Cylinders 49 and 51 are integrally connected and form a unitary whole in this example, with cylinder 49 extending perpendicular to cylinder 51. The outlet passageway 50 extends in a substantially vertical direction in use in this example and the inlet passageway 48 extends transverse to the outlet passageway and in a horizontal direction in use in this example. The outlet passageway is centrally positioned relative to the inlet passageway in this example and is positioned between inlet 24 and outlet 26 of the valve chamber 22 in this example.

The switching cylinder 49 has a pair of spaced-apart, female open threaded ends 52 and 54 which are selectively closed via end members, in this example threaded end caps 56 and 58. As seen in FIG. 2, end 54 of the switching cylinder 49 aligns with inlet 26 of the valve chamber 22 and end 52 aligns with inlet 24 of the valve chamber. Referring to FIG. 4, cap 56 is adjacent to and in communication with float seat 36 and cap 58 is adjacent to and in communication with float seat 38. As seen in FIG. 1, the inner portions 11 and 12 of conduits 9 and 10 couple to the cylinder.

Figure 3:
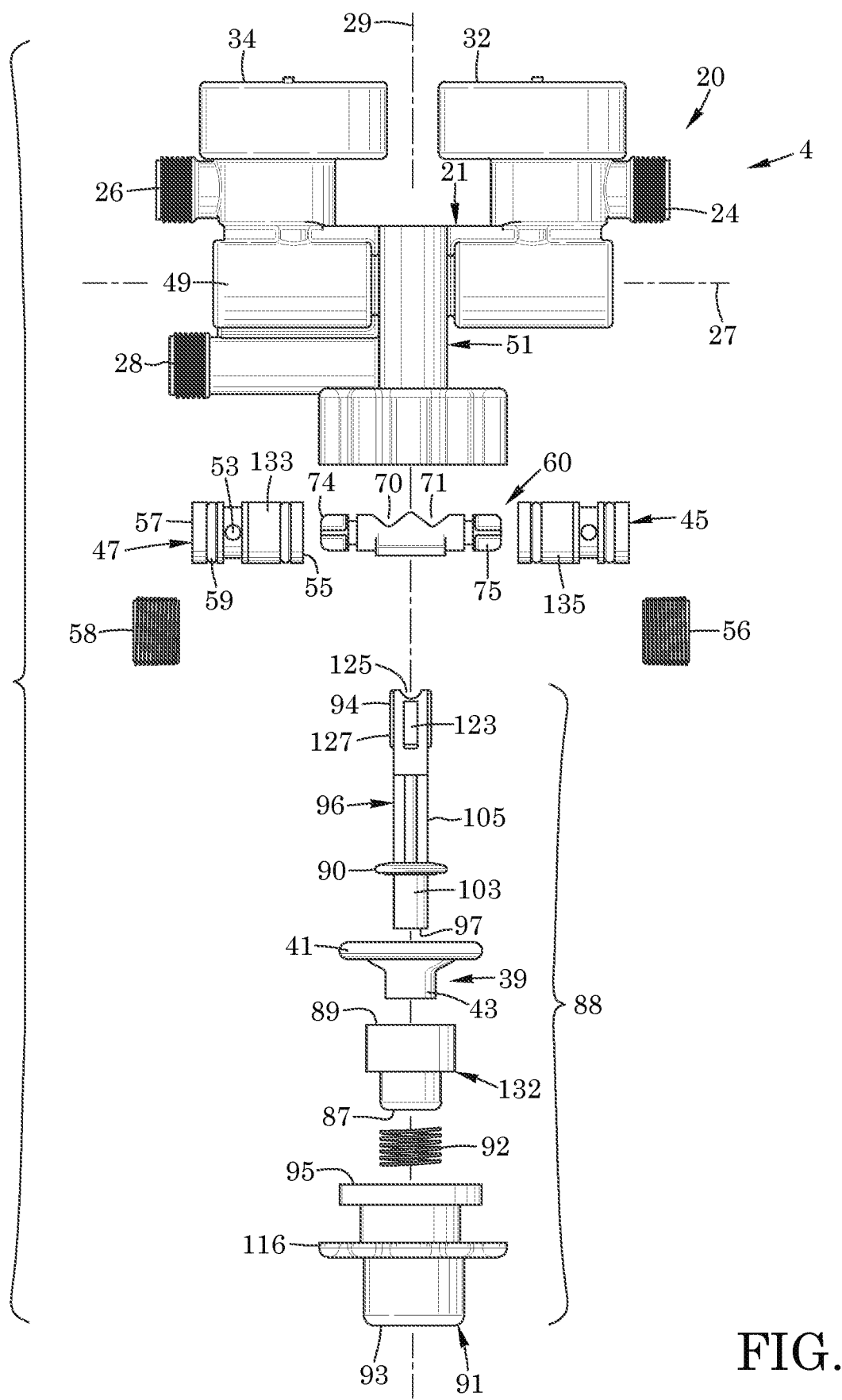
FIG. 3 is an exploded elevation view of the device of FIG. 1, the device including a valve chamber, a valve member, and a catch apparatus.

As seen in FIG. 3, the device 20 includes a pair of valve elements 45 and 47 disposed within the switching cylinder 49. Each of the valve elements is tubular in this example and includes a plurality of circumferentially spaced-apart, radially-extending apertures 53 extending therethrough adjacent to inner ends 55 thereof. Each of the valve elements includes an outer end shaped to abut a respective one of the end caps, as seen in FIG. 2 by outer end 57 of valve element 47 abutting end cap 58. Referring to FIG. 3, each of the valve elements has an annular recess 69 and includes a sealing member, in this example an o-ring 59 positioned within the recess and between the ends 55 and 57 thereof. As seen in FIG. 2, the o-rings are configured to sealably engage with switching cylinder 49 so as to inhibit liquid from reaching and leaking past caps 56 and 58 and out of the device 20. The valve elements 45 and 47 are configured to be stationary in this example.

Referring to FIG. 2, the device 20 includes a pair of sleeves 133 and 135 disposed within the switching cylinder 49. Each sleeve has an annular recess 137 and includes a sealing member, in this example an o-ring 139 shaped to fit within the recess. The o-rings are configured to sealably engage with switching cylinder 49. The sleeves are not shown in the schematic FIGS. 4 to 6.

Referring to FIG. 3, the device 20 includes a valve member, in this example a spool valve member 60. As seen in FIG. 4, the valve member is disposed within the interior 30 of the valve chamber 22 and is configured to move within the switching cylinder 49 and along horizontal axis 27 and inlet passageway 48.

Figure 7:
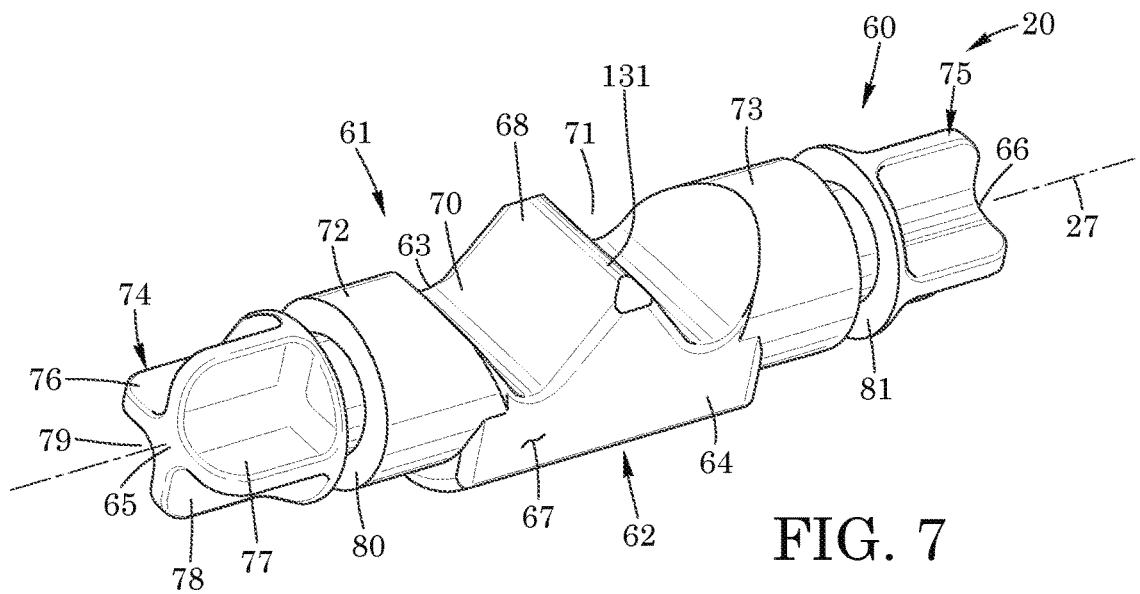
FIG. 7 is a top, front, left side perspective view of the valve member of FIG. 3.

As seen in FIG. 7, the valve member 60 is generally cylindrical in shape and may also be referred to as a switching piston. The valve member has a top 61, a bottom 62, a pair of spaced-apart sides 63 and 64 extending between the top and bottom thereof, and a pair of spaced-apart ends 65 and 66 extending between the sides and top and bottom thereof.

Figure 8:
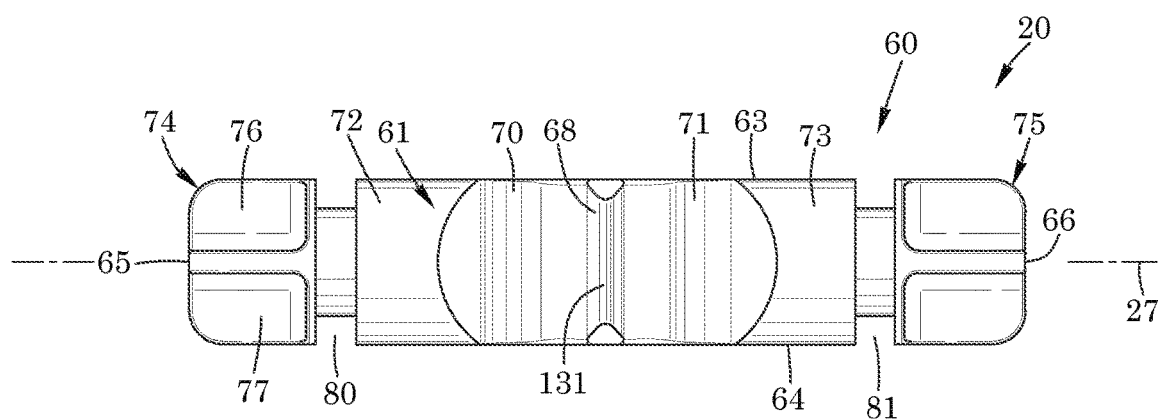
FIG. 8 is a top plan view thereof.
Figure 9:
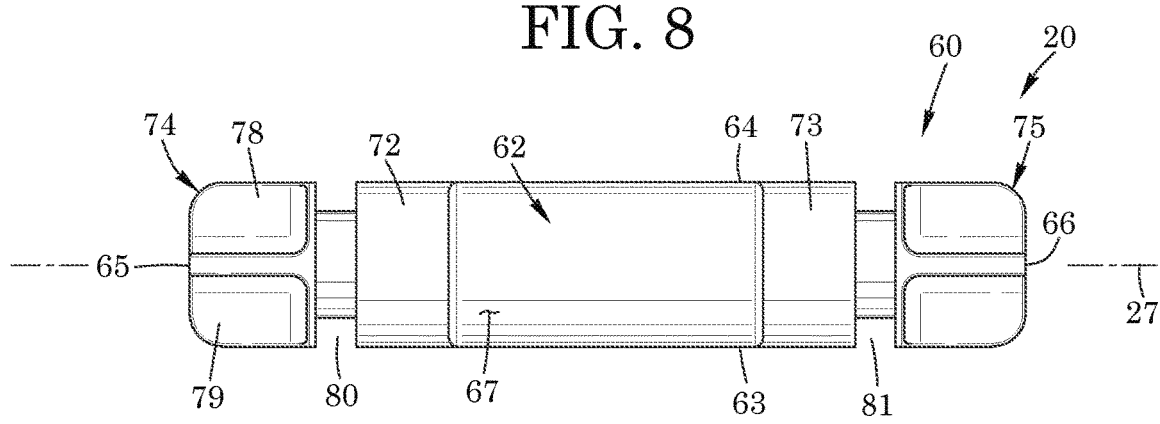
FIG. 9 is a bottom plan view thereof.

As seen in FIGS. 7 and 9, the valve member 60 includes a lower central portion 67 that extends from the bottom 62 towards the top 61 of the valve member. The lower central portion of the valve member is generally a rectangular prism in shape in this example. Referring to FIGS. 7 and 8, the valve member 60 includes an upper central portion 68 that extends from the top 61 towards the bottom 62 of the valve member. The upper central portion of the valve member is a triangular prism in shape in this example. The central portions 67 and 68 of the valve member 60 align with each other, couple together, form an integrated whole, and are positioned between the ends 65 and 66 of the valve member in this example.

As best seen in FIG. 7, the valve member has a pair of longitudinally spaced-apart recesses 70 and 71 that extend from the top 61 towards the bottom 62 thereof. The recesses are positioned between the ends 65 and 66 of the valve member 60 and are v-shaped in this example. The upper central portion 68 of the valve member extends upwards from and is positioned between the recesses 70 and 71 in this example.

Still referring to FIG. 7, the valve member 60 includes a pair of elongate portions 72 and 73 that are cylindrical in this example. The lower central portion 67 of the valve member is positioned between the elongate portions in this example and is coupled to and integrally formed with the elongate portions.

The valve member 60 includes a pair of end portions 74 and 75. End portion 74 is adjacent to end 65 of the valve member and extends towards end 66 of the valve member. End portion 75 is adjacent to end 66 of the valve member 60 and extends towards end 65 of the valve member. The end portions 74 and 75 of the valve member couple to and are integrally formed with elongate portions 72 and 73 of the valve member in this example. As seen in FIG. 7, each of the end portions is cross-shaped in lateral cross-section in this example. Each of the end portions 74 includes one or more recessed portions and in this example, four circumferentially spaced-apart recessed portions 76, 77, 78 and 79 located adjacent to respective ends 65 of the valve member 60. The recessed portions extend inwardly so that the effective cross-sectional area of the valve member 60 is reduced adjacent to the end portions 74 and 75 and ends 65 and 66 of the valve member. Referring to FIGS. 2 to 4, the end portions 74 and 75 of the valve member 60 are shaped to be received within and be moveable relative to sleeves 133 and 135 and valve elements 45 and 47.

Figure 6:
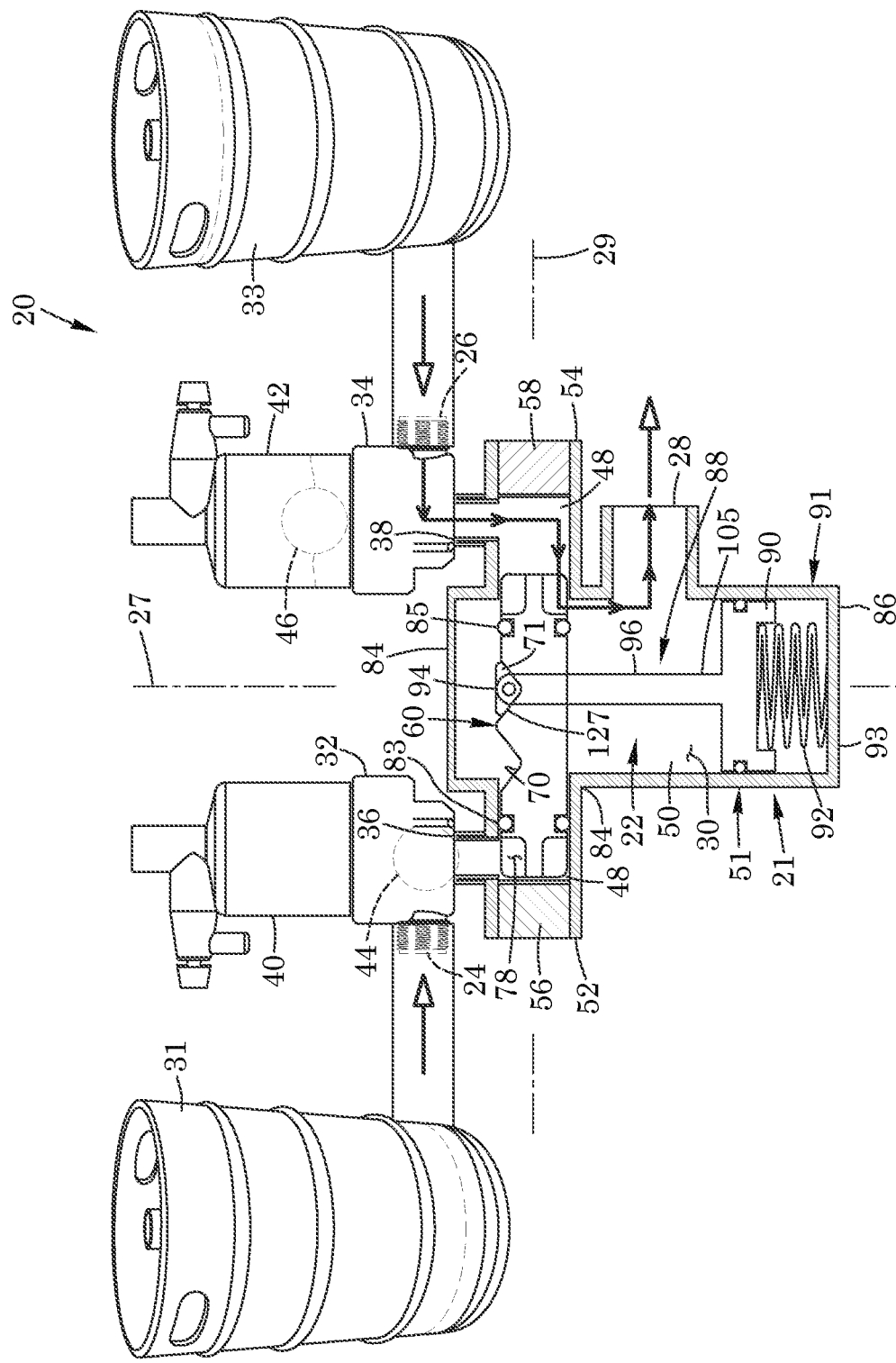
FIG. 6 is a schematic rear elevation view of the device of FIG. 5, with the valve member being shown in a second position which promotes communication between the second inlet and the outlet of the valve chamber, and with the catch apparatus shown biased against a second recess of the valve member.

As seen in FIG. 7, the valve member 60 includes a pair of annular recesses 80 and 81 shaped to receive sealing members, in this example o-rings 83 and 85 seen in FIG. 4. Referring to FIG. 8, recess 80 is positioned between elongate portion 72 and end portion 74 of the valve member. Recess 81 is positioned between elongate portion 73 and end portion 75 of the valve member 60. Referring to FIGS. 4 and 6, the end portions 74 and 75 are shaped to sealably engage with switching cylinder 49.

Figure 5:
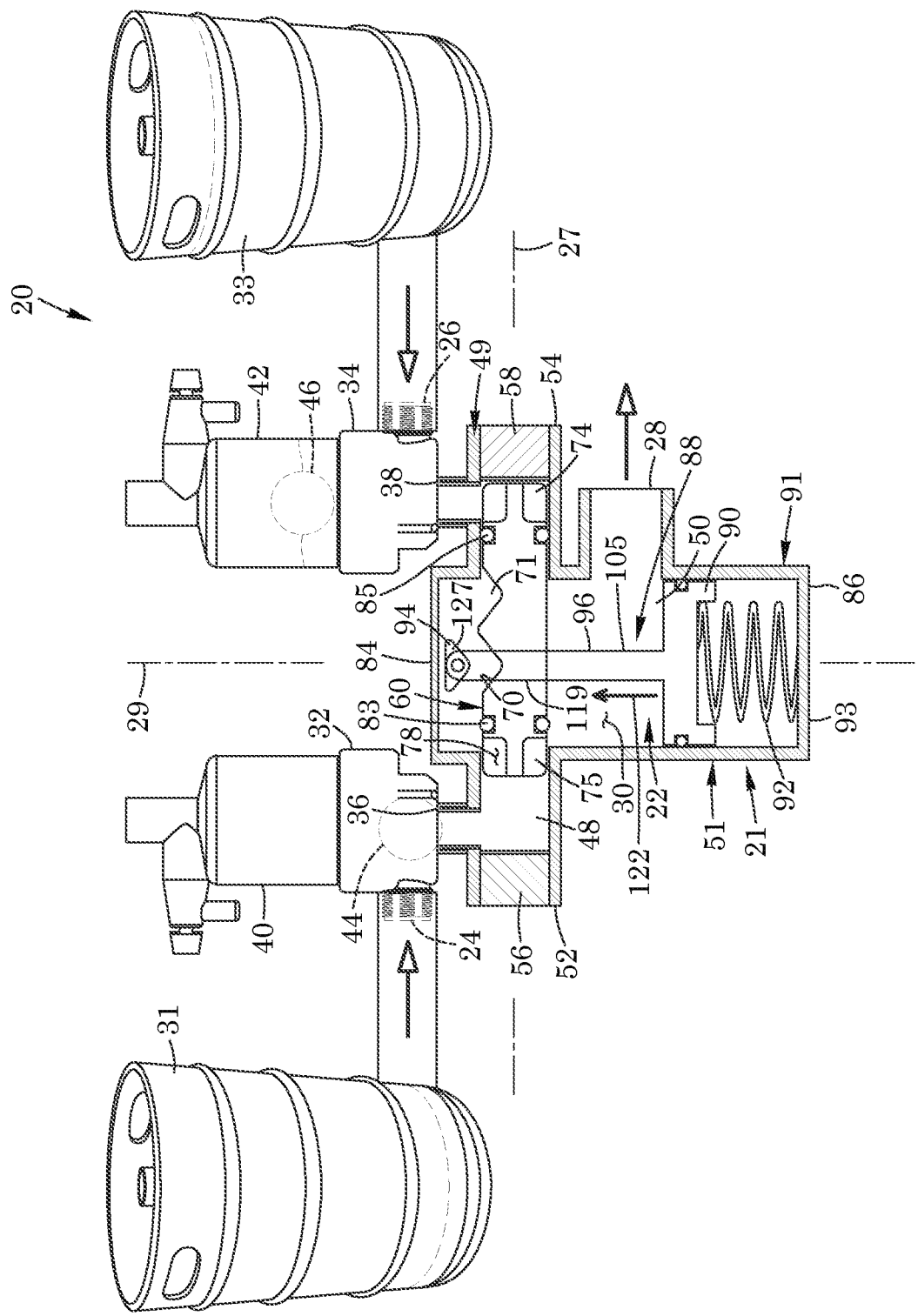
FIG. 5 is a schematic rear elevation view of the device of FIG. 4, with the valve member being shown in the first position, with the first source of liquid being depleted and with the catch apparatus being shown biased upwards and free from the valve member.

Referring to FIG. 5, catch cylinder 51 has a top 84 and a bottom 86. The device 20 includes a catch apparatus 88 positioned within the catch cylinder. As seen in FIG. 3, the catch apparatus includes a piston 90 and the catch apparatus may be referred to as a hold-down piston. Referring to FIG. 4, the cross-sectional area of the piston, as measured in a direction extending radially outwards from vertical axis 29, is in this example at least twice the cross-sectional area of the valve member 60 as measured in a direction extending laterally from horizontal axis 27. The cross-sectional area of the piston may be at least three times larger than that of the valve member in another example. Referring to FIG. 2, the piston 90 is positioned within and slidably engageable with the interior 114 of outlet passageway 50 along vertical axis 29. The piston is positioned below inlets 24 and 26 of the valve chamber 22 in this example and from the perspective of FIG. 2.

Still referring to FIG. 2, the catch apparatus 88 includes an outer receptacle 91 that is generally tubular in this example. The outer receptacle may be considered part of the catch cylinder 51. The outer receptacle 91 has a closed end 93 that aligns with the bottom 86 of the catch cylinder. The outer receptacle extends from the bottom of the catch cylinder 51 towards the top 84 of the catch cylinder. The outer receptacle 91 has an open end 95 shaped to fit within and threadably engaging with a lower bore 130 of the valve body 21.

The outer receptacle includes an outwardly extending flange 112 positioned between ends 93 and 95 thereof. The flange abuts the outer end 116 of the bore 130. The flange of the outer receptacle 91 couples to the valve body 21 via fasteners, in this example bolts 118 and 120.

As seen in FIG. 3, the catch apparatus 88 includes an inner receptacle 132 that is tubular in this example. Referring to FIG. 2, the inner receptacle has a closed end 87 positioned between ends 93 and 95 of the outer receptacle 91. The inner receptacle 132 has an open end 89 spaced from the closed end thereof. The inner receptacle is shaped to be received within and is moveable relative to the outer receptacle 91 and along vertical axis 29.

The catch apparatus 88 includes a resilient member, in this example a spring 92 that extends between piston 90 and the bottom 86 of cylinder 51. As seen in FIG. 2, the outer receptacle 91 is shaped to receive the spring, with the spring abutting and being positioned between the closed end 93 of the outer receptacle and the closed end 87 of the inner receptacle 132.

Figure 11:
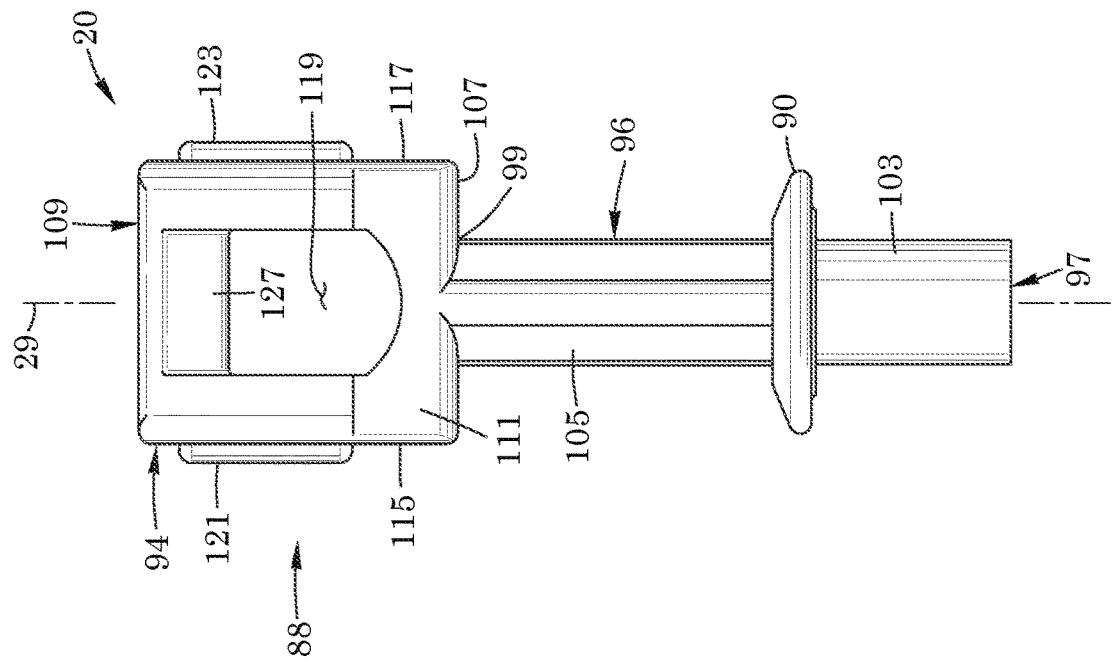
FIG. 11 is a left side elevation view thereof.
Figure 10:
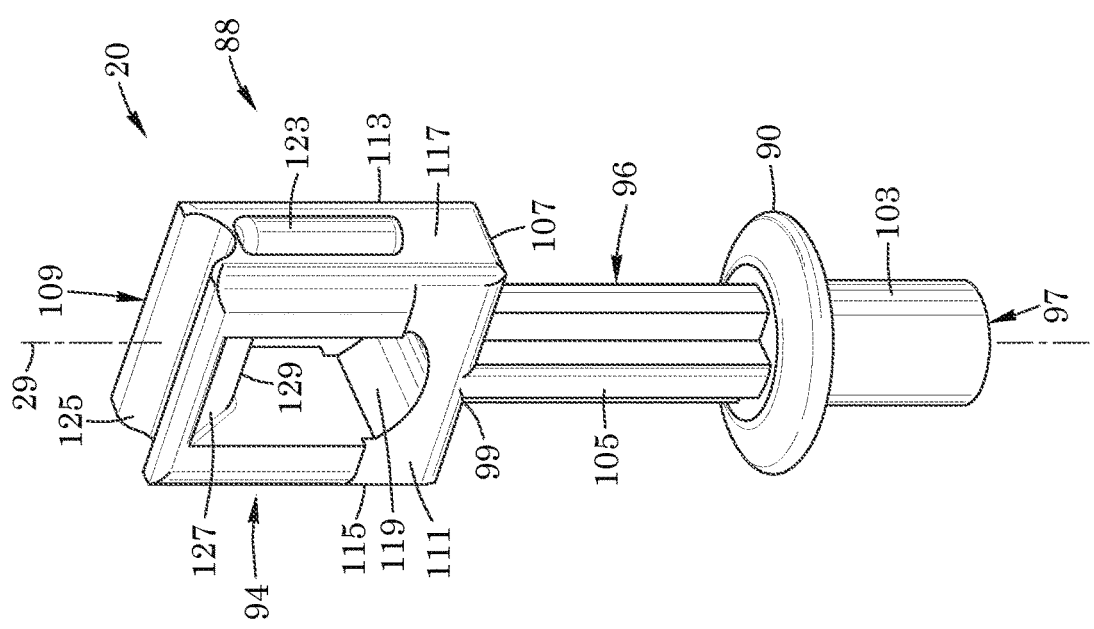
FIG. 10 is a front, top, left side perspective view of the catch apparatus of FIG. 3.

As seen in FIGS. 10 and 11, the catch apparatus 88 includes an elongate member, in this example a shaft 96 that extends along the vertical axis 29. The shaft has a first or lower end 97 and a second or upper end 99. As seen in FIG. 2, the inner receptacle 132 is shaped to receive the lower end 97 of the shaft 96 via the open end 89 of the inner receptacle. The inner receptacle and lower end of the shaft couple together in this example via a fastener 101. The shaft 96 and inner receptacle 132 thus move as one along vertical axis 29.

Referring to FIG. 10, piston 90 extends about and couples to the shaft between the lower end 97 and the upper end 99 of the shaft. The shaft 96 includes a first or lower portion 103 that extends along the vertical axis 29 from the lower end of the shaft to the piston. The lower portion of the shaft is cylindrical in shape in this example. The shaft 96 includes a second or upper portion 105 that extends along the vertical axis 29 from the upper end 99 of the shaft to the piston 90. The upper portion of the shaft is cross-shaped in lateral cross-section in this example.

As seen in FIG. 2, the device 20 includes a sealing member, in this example a diaphragm 39. The diaphragm has a first or outer end portion 41 which couples to the outer receptacle 91 adjacent to end 95 of the outer receptacle. The diaphragm 39 has a second or inner end portion 43 shaped to be received by the inner receptacle 132 via the open end 89 of the inner receptacle. The inner end portion of the diaphragm couples to and extends about the lower portion 103 of the shaft 96. The diaphragm 39 is configured to inhibit liquid within catch cylinder 51 from reaching spring 92 while also enabling axial movement of shaft 96 along vertical axis 29.

As seen in FIG. 10, the catch apparatus 88 includes a catch 94. The catch has a bottom 107 which couples to and is integrally formed with the upper end 99 of shaft 96 in this example. The catch 94 has a top 109 and a pair of spaced-apart sides 111 and 113 which extend between the bottom and top thereof. The top, bottom 107 and sides of the catch are generally rectangular and similar in size in this example. The catch 94 has a pair of spaced-apart ends 115 and 117 which extend between the sides 111 and 113, bottom 107 and top 109 thereof. As seen in FIG. 11, the sides 111 of the catch are also generally in rectangular in side profile.

As seen in FIGS. 10 and 11, an aperture 119 extends through the catch 94 from side 111 to side 113 of the catch in this example. Referring to FIG. 5, the aperture 119 is shaped to enable the valve member 60 to freely extend and move therethrough and along horizontal axis 27. As seen in FIG. 11, a pair of elongate protrusions, in this example guiding members 121 and 123 extend outwards and along the sides 115 and 117 of the catch 94. The guiding members extend from adjacent the top 109 of the catch towards the bottom 107 of the catch. The guiding members 121 and 123 are shaped to fit within corresponding elongate recesses, in this example guide tracks 110 of the valve body 21 seen in FIG. 2. The guide members 123 and tracks 110 extend in parallel with vertical axis 29 in this example.

As seen in FIG. 10, the catch 94 has a channel 125 that extends along the top 109 of the catch 94 and that extends from side 115 to side 117 of the catch in this example. The catch includes an engagement portion 127 in communication with aperture 119. The engagement portion extends downwards from the top 109 of the catch towards the bottom 107 of the catch and extends between sides 115 and 117 of the catch in this example.

As seen in FIG. 4, the engagement portion 127 of the catch 94 is triangular in side profile in this example. Referring to FIG. 5, the catch 94 is resiliently-biased upwards via spring 92 as shown by arrow of numeral 122.

In operation and referring to FIG. 4, when both sources 31 and 33 of liquid contain liquid, the liquid therefrom flows past inlets 24 and 26 and into float chambers 40 and 42. This causes the float members 44 and 46 to rise upwards and float within their respective float chambers. This as a result causes the first source 31 of liquid to be in communication with the inlet passageway 48 adjacent to end 52 of cylinder 49 and causes the second source 33 of liquid to be in communication with the inlet passageway adjacent to end 54 of cylinder 49. Pressure from both sources 31 and 33 of liquid may thus be acting against the valve member 60. One of the sources of liquid may be at a higher pressure or, alternatively, one of the kegs may be opened first, in this case that associated with source 31 of liquid.

The pressure difference caused by the above promotes movement of the valve member 60 along horizontal axis 27 to the right, from the perspective of FIG. 4, to a first position shown in FIG. 4. When the valve member is in the first position, fluid communication occurs between first inlet 24 and outlet 28 of the valve chamber 22 via liquid passing through recessed portions 78. This allows liquid from the first source 31 of liquid to flow through the valve chamber from first inlet 24 to the outlet, as generally shown by arrow of numeral 98. The valve member 60 in the first position shown in FIG. 4 is also shaped via o-rings 85 to inhibit communication between second inlet 26 and outlet 28 of the valve chamber 22.

The first source 31 of liquid also fills catch cylinder 51 and exerts a higher pressure on piston 90 so as to bias the piston towards the bottom 86 of the catch cylinder 51. This causes the engagement portion 127 of catch 94 to abut the valve member 60 thereby. The engagement portion of the catch abuts the first recess 70 of the valve member when the valve member is in the first position seen in FIG. 4. The catch apparatus 88 is thus shaped inhibit displacement of the valve member 60 from its first position when the catch apparatus is in communication with the first source 31 of liquid.

Referring to FIG. 5, when the first source of liquid is depleted, the liquid level within float chamber 40 lowers and float member 44 thus lowers so as to lodge on and be received by float seat 36. The float member so positioned inhibits communication between the first source 31 of liquid and inlet passageway 48. The float chamber 40 remains under pressure because the chamber is sealed at the bottom via the float member 44 and the $CO_2$ gas has nowhere to go. At this stage, communication between the first source 31 and second source 33 of liquid and the outlet passageway 50 is inhibited. With the first source 31 of liquid sealed by float member 44 and the second source 33 of liquid still sealed by catch 94 and if the line (not shown) coupled to the outlet 28, such as a beer line, is open, the liquid in the valve chamber 22 empties.

This in turn causes spring 92 to raise the catch, which will free valve member 60 to move axially along horizontal axis 27. Thus, put another way, pressure exertion against piston 90 is reduced, thereby enabling spring 92 to bias the engagement portion 127 of the catch 94 upwards, from the perspective of FIG. 5, so as to be free from the valve member 60. In other words, when source 31 of liquid is depleted, such as in the case of a keg being substantially empty, the dropping of the float member 44 onto to float seat 36 depressurizes the catch cylinder 51, causing the engagement portion of the catch to be pushed upwards by spring 92.

Pressure now exerted on the right side of the valve member 60, from the perspective of FIG. 4, causes the valve member to slide along horizontal axis 27 to the left to a second position seen in FIG. 6. This thus in effect opens second inlet 26 of the valve chamber 22, enabling liquid communication between the second inlet and outlet 28. The liquid within the valve chamber 22 is exerted against piston 90, causing the catch 94 to engage the valve member 22 as well. This is the case no matter if float member 44 is sealing. The valve member 60 in its second position seen in FIG. 6 is shaped to seal/inhibit liquid communication between first inlet 24 and outlet 28 in this example via o-ring 83. The first source 31 of liquid can thereafter be disconnected or replaced and pressurized, without affecting the rest of the operation of the device 20.

Put another way, pressure from the second source 33 of liquid continues to act against the valve member 60. This causes a pressure differential within the inlet passageway 48 and switching cylinder 49 which functions to automatically move the valve member to the left, from the perspective of FIG. 5, to its second position seen in FIG. 6. The valve member 60 in its second position is configured to enable communication between second inlet 26 and outlet 28 and inhibits communication between first inlet 24 and the outlet. Pressure from the second source 33 of the liquid is exerted against piston 90, thereby causing catch 94 to lower once more, with the engagement portion 127 of the catch abutting the second recess 71 of the valve member. The catch apparatus 88 is thus shaped inhibit displacement of the valve member from the second position thereof when the catch apparatus is in communication with the second source 33 of liquid. At this stage, the first source 31 of liquid may be replenished, by way of replacing the keg for example.

The above process may be repeated when the second source 33 of liquid is depleted, with the catch 94 being raised upwards, the valve member 60 reverting back to the first position shown in FIG. 4, and the catch thereafter engaging the valve member once more as described above. Thus, the two inlets 24 and 26 both channel the flow of liquid, such as beer, to the outlet 28, one at a time. Assuming the source 31 of liquid is a keg full of beer, when the keg gets empty, the device 20 is configured to switch to source 33 of liquid, such as a second keg of beer for example. When the second keg of beer gets empty, the device is configured to switch back to source 31 of liquid, if source 31 was replaced with a full keg. If both all kegs are empty, then action and flow of liquid through the outlet 28 comes to a stop.

When pressurized beer kegs are applied at both inlets of the device at the same time, a valve member in theory could remain in the middle: in this case, it may be that the kegs both flow together in parallel mode, or flow of liquid may cease to flow.

The above occurrences may be inhibited by device 20 as herein described because as the pressure builds up in the valve chamber 22, the engagement portion 127 of the catch 94 abuts the valve member 60 and is caused to abut one of the recesses 70 and 71, thus immobilizing the valve member into one of its two proper positions shown in FIGS. 4 and 6, respectively. The valve member may move to the left or right depending only on the pressure of liquid/beer and catch 94. The valve member 60 is configured to be free-running, and it thus does not take much pressure to move the valve member just incrementally in either direction. Such incremental movement may be all that is required for the device 20 to switch between inlets 24 and 26, because the catch 94 is configured to apply a stronger force to ensure that the valve member 60 is thereafter further moved to its proper position. This proper positioning may open fully passageway 48 for liquid from the keg that was opened first and close fully the other inlet. At any time the empty keg can be replaced and it can have the float up too, so the cycle can be repeated. The other keg can now be carefully set without having to rely on the float chamber, no matter if it is opened or closed.

Referring to FIG. 10, the catch 94 is a very wide V in shape, or wedge-shaped, with a rounded bottom portion 129 in this example. As seen in FIG. 7, the upper central portion 68 of the valve member 60 is also v-shaped and up-side down. Portion 68 is likewise rounded at center of the V in this example, as shown by numeral 131. Thus, the catch 94 of FIG. 10 and portion 68 of the valve member 60 of FIG. 7 may function like two round balls, one on top of the other: the top ball is shaped to fall to one side or the other of the bottom ball, as the top ball receives the pressure on one side thereof only and moves in accordance with the pressure. The 'V' shape of the catch 94 and valve member 60 seen in FIGS. 7 and 10 enables the valve member to move in a first direction, in this example horizontally, by applying a force in a second direction perpendicular to the first direction, in this example vertically.

FIGS. 12 to 19 show a liquid source switch-over device 20.1 according to another embodiment. Like parts have like numbers and function as the embodiment shown in FIGS. 1 to 11 with the addition of "0.1". Device 20.1 is substantially the same as device 20 shown in FIGS. 1 to 11 with the following exceptions.

Figure 17:
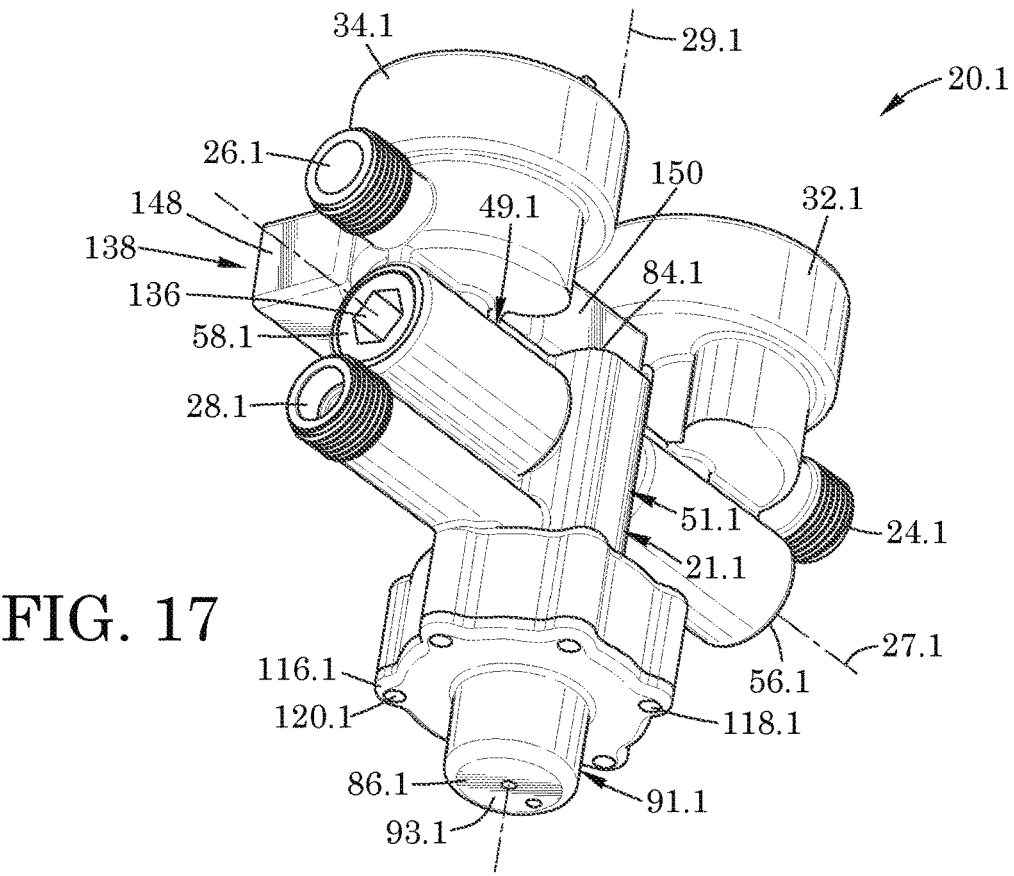
FIG. 17 is a front, bottom, left side perspective view thereof.
Figure 18:
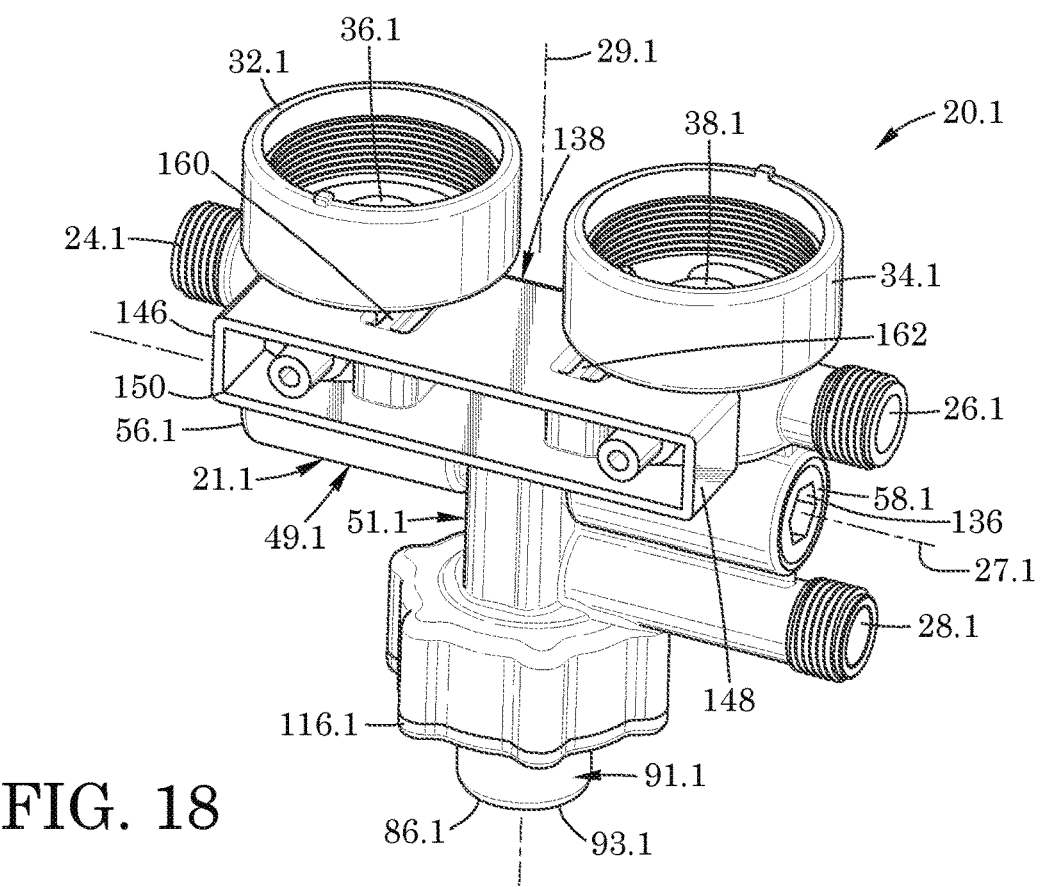
FIG. 18 is a rear, top, left side perspective view thereof.
Figure 19:
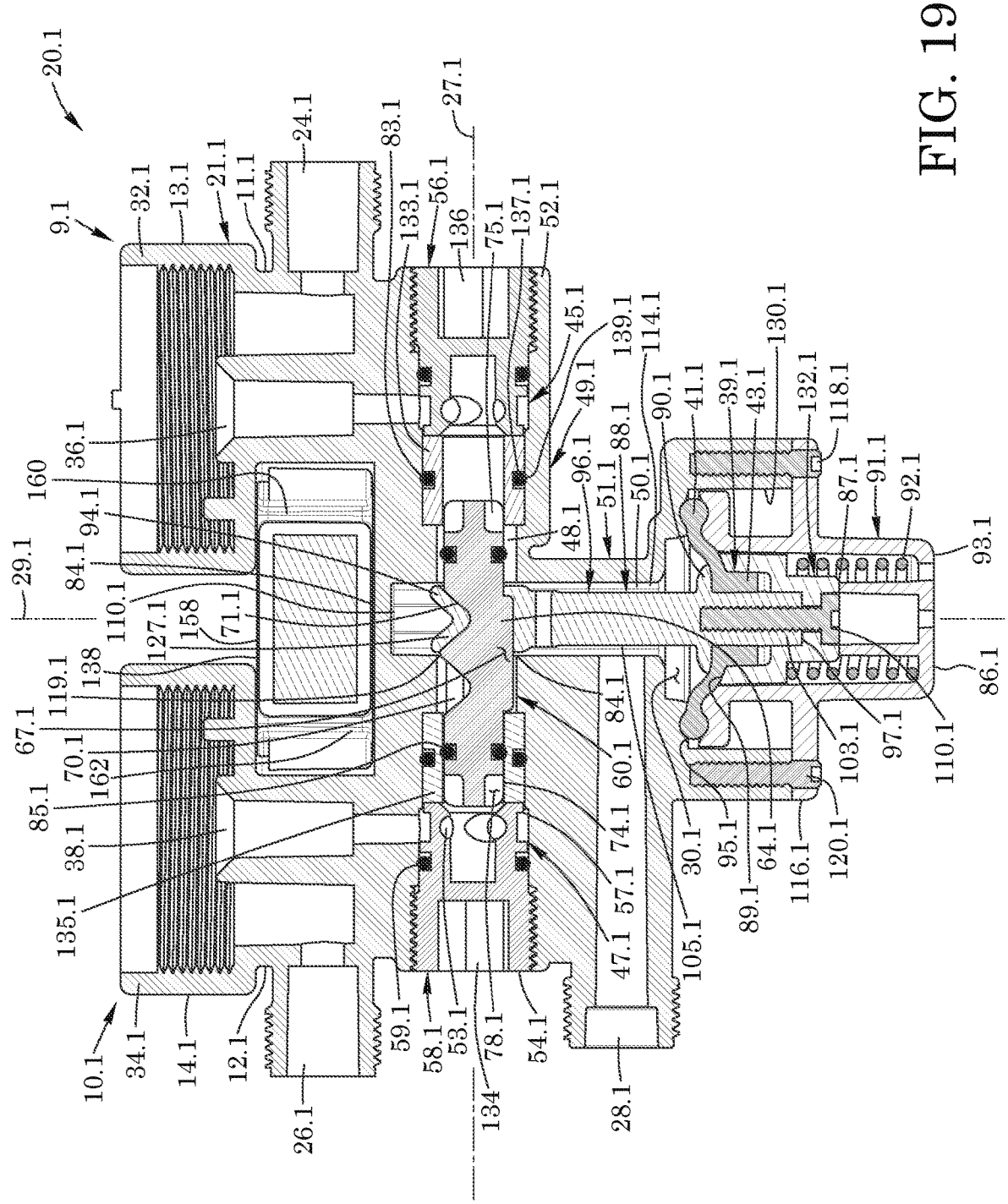
FIG. 19 is a cross-section elevation view of the device of FIG. 18, with the wall mount of FIG. 18 shown coupled thereto.

As seen in FIGS. 17 and 19, threaded caps 56.1 and 58.1 include recesses, in this example sockets 134 and 136 for selectively installing or removing the caps from switching piston 49.1. In this embodiment, valve elements 45.1 and 47.1 are integrally connected to and formed with threaded caps 56.1 and 58.1, respectively.

Figure 12:
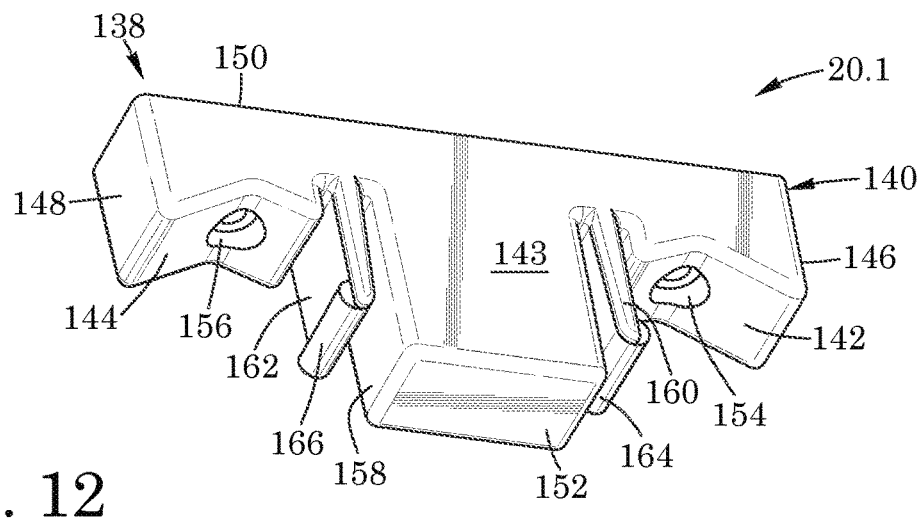
FIG. 12 is a top, front, left side perspective view of a wall mount for a liquid source switch-over device according to a second aspect.

As seen in FIG. 12, the device 20.1 includes a wall mount 138. The wall mount includes a base 140 that is generally T-shaped in top profile in this example, with recessed portions 142 and 144 adjacent to opposed ends 146 and 148 thereof. The recessed portions are v-shaped in top profile in this example. The mount has a rear 150 shaped to extend along a wall (not shown) and a front 152 spaced-apart from the rear. The front and rear extend between the ends 146 and 148 of the mount 138. The front, rear and ends of the wall mount are rectangular in this example. A pair of apertures 154 and 156 extend through recessed portions 142 and 144, respectively, through to the rear 150 of the wall mount 138. The wall mount couples to the wall via fasteners, in this example bolts (not shown) which extend through the apertures and selectively engage with the wall. The wall mount 138 has a top 143 seen in FIG. 12 and a bottom 145 seen in FIG. 14. The top and bottom of the wall mount are generally T-shaped.

The wall mount 138 includes a central portion 158 positioned between ends 146 and 148 thereof and which extends from rear 150 thereof, past the recessed portions 142 and 144 thereof, and to the front 152 thereof. The central portion of the wall mount is a rectangular prism in shape in this example.

As seen in FIG. 12, the wall mount 138 includes a pair of elongate resilient members 160 and 162 coupled to and extending outwards from the base 140 thereof. The central portion 158 of the wall mount is positioned between the resilient members in this example. Resilient member 160 is positioned between recessed portion 142 of the wall mount 138 and central portion 158 of the wall mount in this example. Resilient member 162 is positioned between recessed portion 144 of the wall mount and central portion of the wall mount in this example. The resilient members are generally rectangular prisms in shaped in this example with distal ends 164 and 166 that are round, protruding and circular in lateral cross-section in this example.

Figure 13:
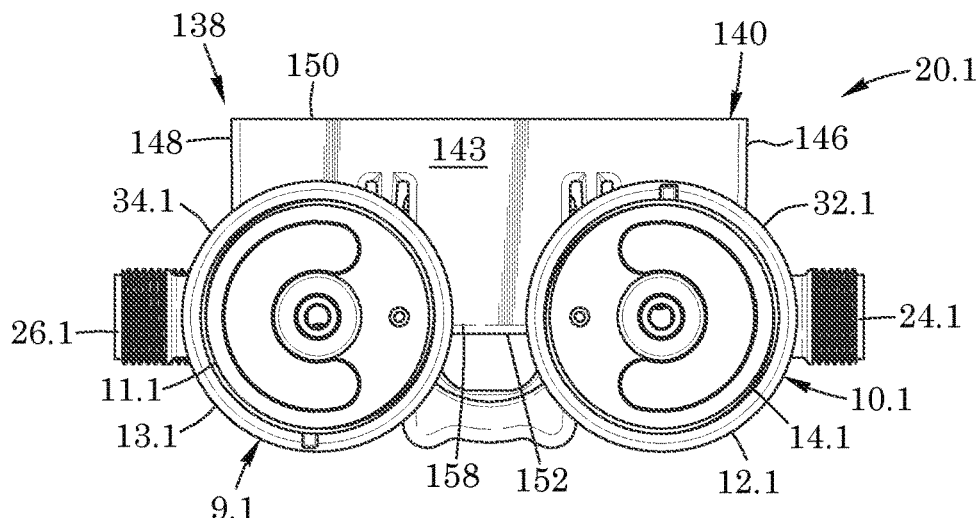
FIG. 13 is a top plan view of the liquid source switch-over device according to the second aspect, together with the wall mount of FIG. 12 coupled thereto, the device including float chambers that are not shown.
Figure 14:
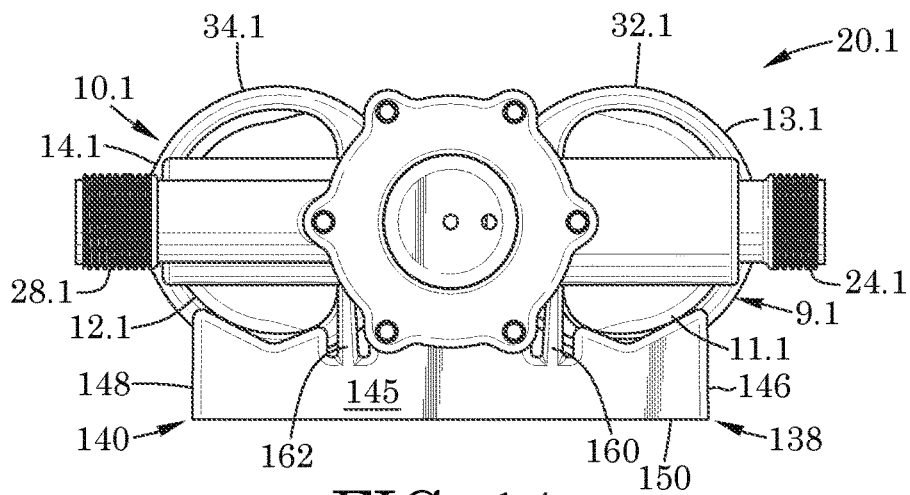
FIG. 14 is a bottom plan view thereof.
Figure 15:
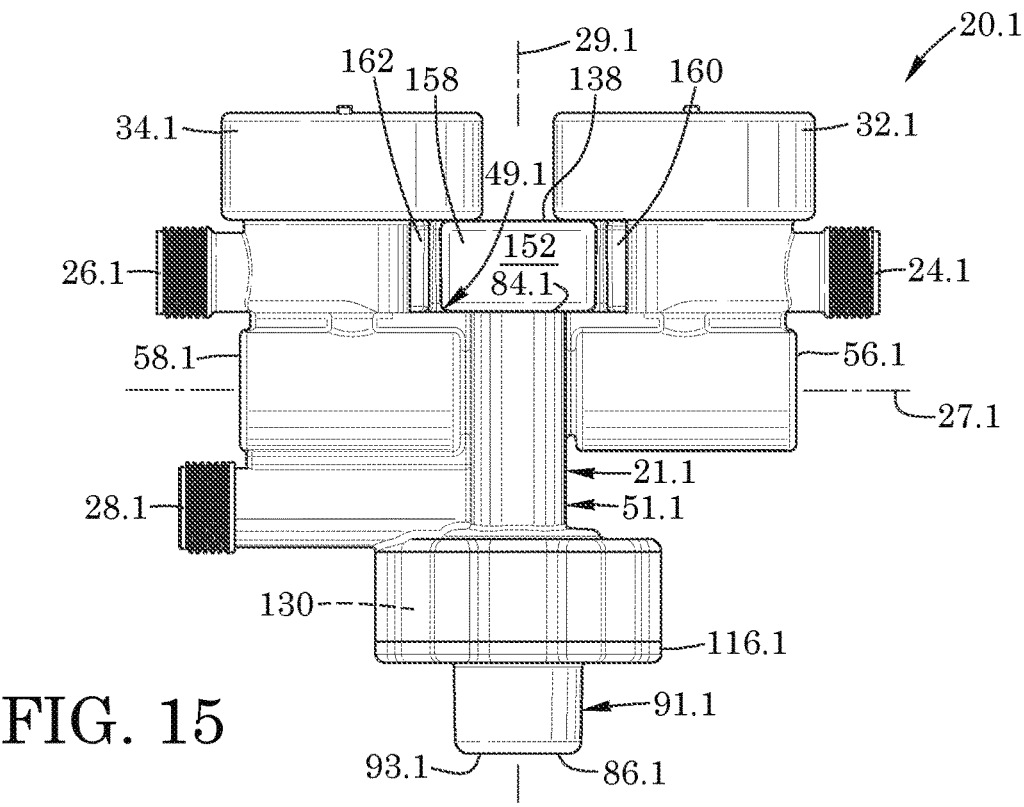
FIG. 15 is a front elevation view thereof.
Figure 16:
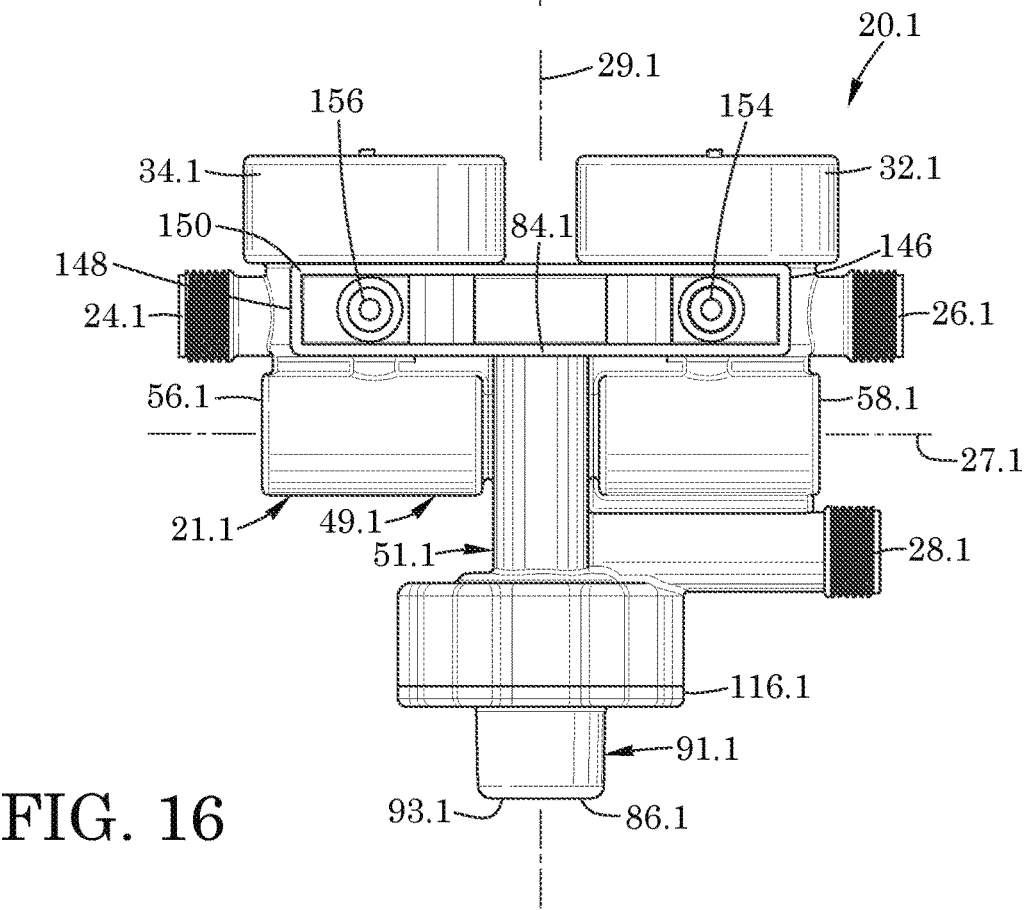
FIG. 16 is a rear elevation view thereof.

Referring to FIG. 14, recessed portions 142 and 144 of the wall mount 138 are shaped to receive lower portions 11.1 and 12.12 of conduits 9.1 and 10.1, with the resilient members 160 and 162 being biased towards and abutable against respective ones of the lower portions of the conduits. As seen in FIG. 13, the outer portions 13.1 and 14.1 of the conduits are shaped to abut the top 143 of the wall mount 138.

It will be appreciated that many variations are possible within the scope of the invention described herein. The device 20 could be used for various applications as part of industrial hydraulics systems. The system works from very low to very high pressure.

Catch apparatus 88 has been described with use of a piston 90, shaft 96 and spring 92 seen in FIG. 2. However, in other embodiments, instead of the latter, a resilient diaphragm on its own may be used for example.

The float chambers 40 and 42 seen in FIG. 4 are not strictly required for the device 20. Rather, float chambers may only be needed if the liquids from the sources of liquid are being pushed by a gas. For example, if two water reservoirs are positioned above the device, the pressure to switch positioning of the valve member 60 and catch 94 may arise from the weight of the water and thus the system in this case may not require floats or float chambers. Another example where float chambers 40 and 42 and float members 44 and 46 are not required is where the reservoirs are positioned below the device 20 and liquid is pumped: such a configuration where the liquid is pumped may not require floats and float chambers. A further example of where floats and float chambers are not needed is where two cylinders are welding gas, air stream or any gas.

When using the device 20 for beer, a configuration may have separate float chambers on the wall. In this case, it may be more convenience to use longer hoses to go the device without the device itself also including floats and float chambers.

The device as herein described may be used to create a reserve for warnings. This may be important for applications that cannot afford interruptions.

Many variations in the latch are possible mechanically.

It will be understood by someone skilled in the art that many of the details provided above are by way of example only and are not intended to limit the scope of the invention which is to be determined with reference to at least the following claims.

What is claimed is:

1. A liquid source switch-over device comprising:
    a valve chamber having first and second inlets in communication with first and second sources of liquid and having an outlet;
    a valve member disposed within the valve chamber and being moveable from a first position in which communication between the first inlet and the outlet is promoted and communication between the second inlet and the outlet is inhibited, to a second position in which communication between the second inlet and the outlet is promoted and communication between the first inlet and the outlet is inhibited; and
    a catch apparatus shaped to inhibit displacement of the valve member when the catch apparatus is in fluid communication with the liquid from one of the sources of liquid.

2. The device as claimed in claim 1 wherein the catch apparatus is shaped inhibit displacement of the valve member from the first position thereof when the catch apparatus is in fluid communication with the liquid from the first source of liquid.

3. The device as claimed in claim 1 wherein the catch apparatus is shaped inhibit displacement of the valve member from the second position thereof when the catch apparatus is in fluid communication with the liquid from the second source of liquid.

4. The device as claimed in claim 1 wherein the catch apparatus is resiliently-biased to remain free from the valve member.

5. The device as claimed in claim 1 wherein the catch apparatus is resiliently-biased to remain free from the valve member when communication between the catch apparatus and the liquid from the first and second sources of liquid is inhibited.

6. The device as claimed in claim 1 wherein the catch apparatus includes a catch disposed within the valve chamber and biased to abut the valve member when the catch is in fluid communication with the liquid from one of the sources of liquid.

7. The device as claimed in claim 6 wherein the valve member includes spaced-apart first and second recesses, with the catch engaging the first recess when the valve member is in the first position and the catch engaging the second recess when the valve member is in the second position.

8. The device as claimed in claim 7 wherein the catch and the recesses are triangular in part in side section and wherein the recesses are v-shaped in side section.

9. The device as claimed in claim 6 further including a piston coupled to the catch, said one of the sources of liquid exerting pressure on said piston and causing the catch to abut the valve member when the piston is in fluid communication with said one of the sources of liquid.

10. The device as claimed in claim 1 wherein the catch apparatus includes a hold-down piston.

11. The device as claimed in claim 10 wherein the piston has a cross-sectional area that is equal to or greater than twice that of the valve member.

12. The device as claimed in claim 10 wherein the piston has a cross-sectional area that is equal to or greater than three times that of the valve member.

13. The device as claimed in claim 1 further including a float member, whereby when the first source of liquid is depleted, the float member lowers and inhibits communication between the first source of liquid and the valve chamber, and the valve member moves to the second position thereby.

14. The device as claimed in claim 1, the sources of liquid being pressurized, wherein the device includes first and second float chambers in fluid communication with the first inlet and the second inlet, respectively, and wherein the device further includes first and second float members disposed within respective ones of the float chambers, whereby, when the first source of liquid is depleted, the first float member abuts a float seat of the first float chamber and inhibits communication between the first source of liquid and the valve chamber, and pressure from the second source of liquid causes the valve member to move to the second position of the valve member thereafter, and when the first source of liquid is replenished and the second source of liquid is depleted, the second float member abuts a float seat of the second float chamber and inhibits communication between the second source of liquid and the valve chamber, and pressure from the first source of liquid causes the valve member to move to the first position of the valve member thereafter.

15. The device as claimed in claim 1 wherein the first source of liquid and the second source of liquid are pressurized.

16. The device as claimed in claim 1, further including the first and second sources of liquid, wherein the first and second sources of liquid comprise pressurized beer.

17. A valve assembly comprising:

a valve member moveable within the valve assembly along a first longitudinal axis, shaped to both enable communication between a first inlet and an outlet of the valve assembly and inhibit communication between a second inlet and the outlet when in a first position, and shaped to both enable communication between the second inlet and the outlet and inhibit communication between the first inlet and the outlet when in a second position; and a catch apparatus moveable within the valve assembly along a second longitudinal axis and shaped to inhibit movement of the valve member when the catch apparatus is in communication with flowable material flowing through one of the inlets.

18. The valve assembly as claimed in claim 17 wherein the first longitudinal axis thereof extends in perpendicular to the second longitudinal axis thereof.

19. The device as claimed in claim 17, further including a wall mount for the valve assembly, the valve assembly including a pair of conduits each having a lower portion and an upper portion coupled thereto, the lower portions of the conduits having cross-sectional areas smaller than cross-sectional areas of the upper portions of the conduits, and the wall mount comprising: a base connectable to a wall, the base having a pair of spaced-apart recesses each shaped to receive a respective one of the lower portions of the conduits, with the upper portions of the conduits abutting the base thereafter; and a pair of resilient members coupled to and extending outwards from the base, each of the resilient members being biased towards and abutable against a respective one of the lower portions of the conduits.

20. A valve assembly having a first inlet connectable to a first source of flowable material, having a second inlet connectable to a second source of flowable material and having an outlet, the device comprising:

a switching cylinder in fluid communication with the inlets;

a spool moveable within the switching cylinder, whereby pressure differences between the sources of flowable material position the spool in a first position that promotes flow of flowable material from a first one of the sources through a first one of the inlets and to the outlet; and a catch apparatus in fluid communication in part with the outlet and which, when in communication with the flowable material from said first one of the sources, inhibits movement of the spool, whereby when said first one of the sources is depleted, the switching cylinder is depressurized at said first one of the inlets and said outlet, thereby releasing the catch apparatus, and pressure of flowable material from a second one of the sources at said second one of the inlets causes the spool to move thereafter to a second position that promotes flow of the flowable material from the second one of the sources through a second one of the inlets and to the outlet, with the catch apparatus now in communication with the flowable material from said second one of the sources and inhibiting movement of the spool once more.

* * * * *

UNITED STATES PATENT AND TRADEMARK OFFICE
CERTIFICATE OF CORRECTION

Page 1 of 1

PATENT NO.       : 11,142,445 B2
APPLICATION NO.  : 16/631639
DATED            : October 12, 2021
INVENTOR(S)      : Leone It is certified that error appears in the above-identified patent and that said Letters Patent is hereby corrected as shown below:

In the Claims

Column 14 Lines 27-29 should read:
18. The valve assembly as claimed in claim 17 wherein the first longitudinal axis extends perpendicular to the second longitudinal axis.

Signed and Sealed this
Eighth Day of February, 2022

Drew Hirshfeld
*Performing the Functions and Duties of the
Under Secretary of Commerce for Intellectual Property and
Director of the United States Patent and Trademark Office*